Dec. 24, 1963   G. E. CAILLETTE   3,115,318
AIRCRAFT
Filed Aug. 21, 1959   17 Sheets-Sheet 4

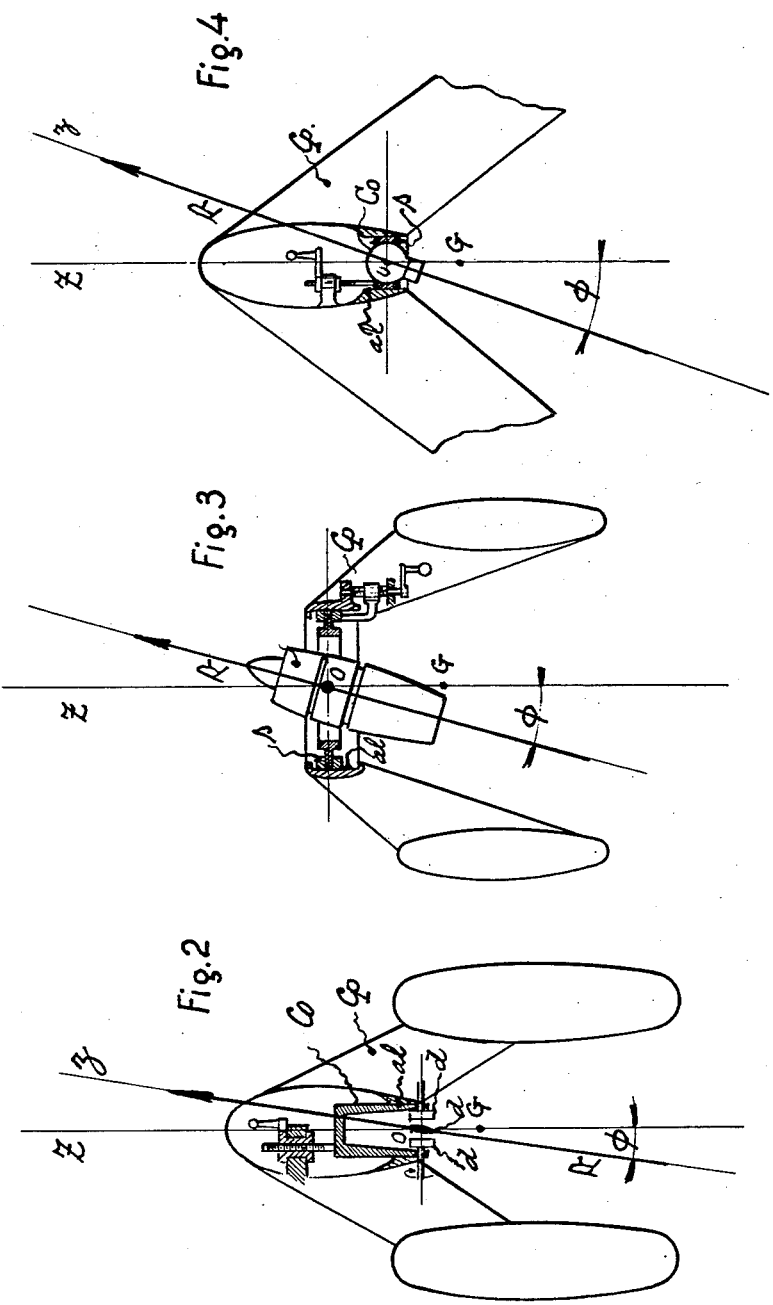

Inventor
Georges Edmond Caillette
by Brown & Seward
Attorneys

Dec. 24, 1963   G. E. CAILLETTE   3,115,318
AIRCRAFT
Filed Aug. 21, 1959   17 Sheets-Sheet 8

Inventor
Georges Edmond Caillette
by Brown + Seward
Attorneys

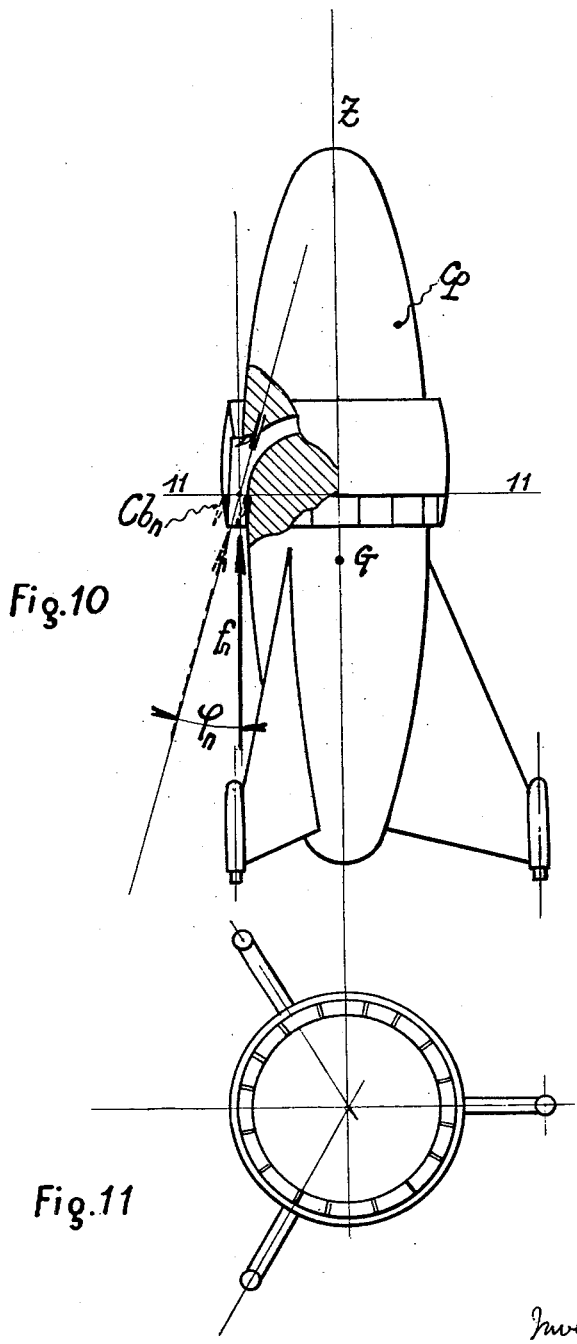

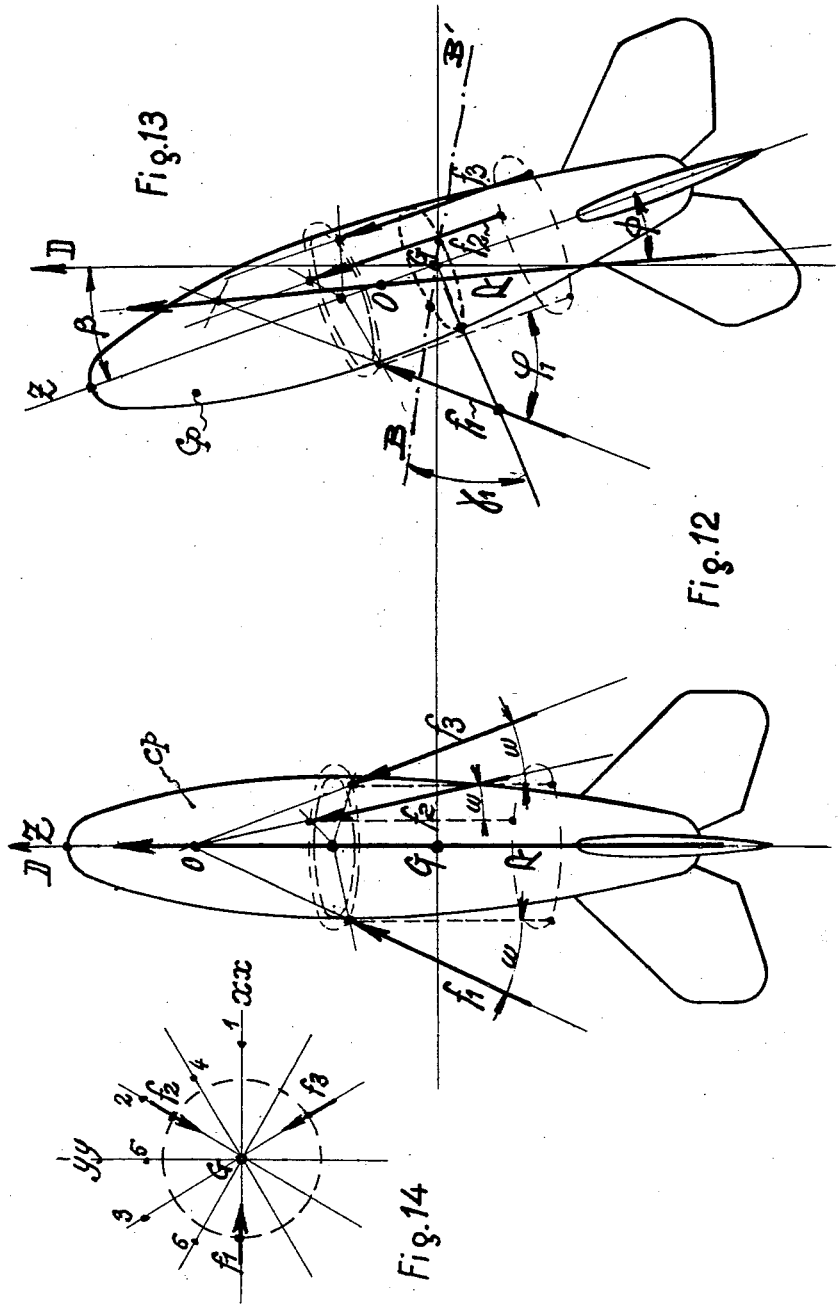

Dec. 24, 1963 G. E. CAILLETTE 3,115,318
AIRCRAFT
Filed Aug. 21, 1959 17 Sheets-Sheet 11
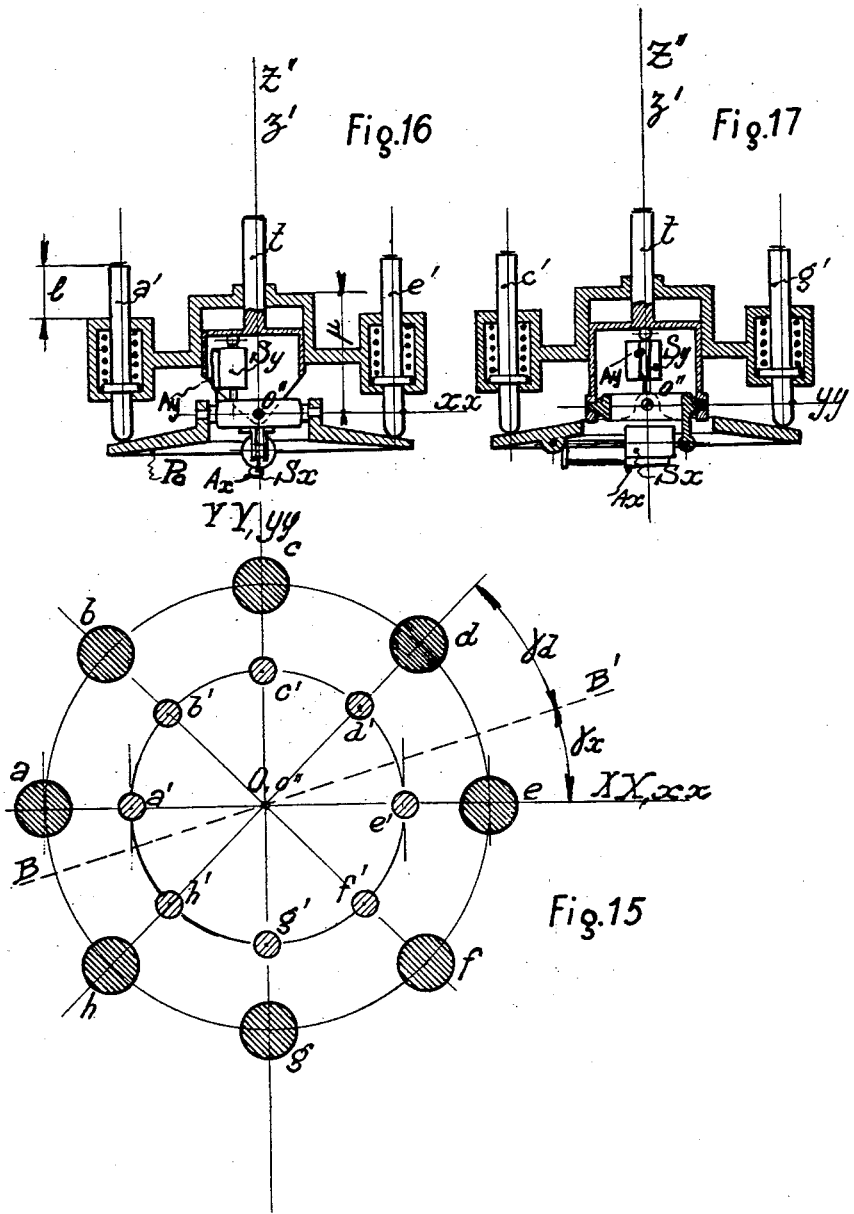

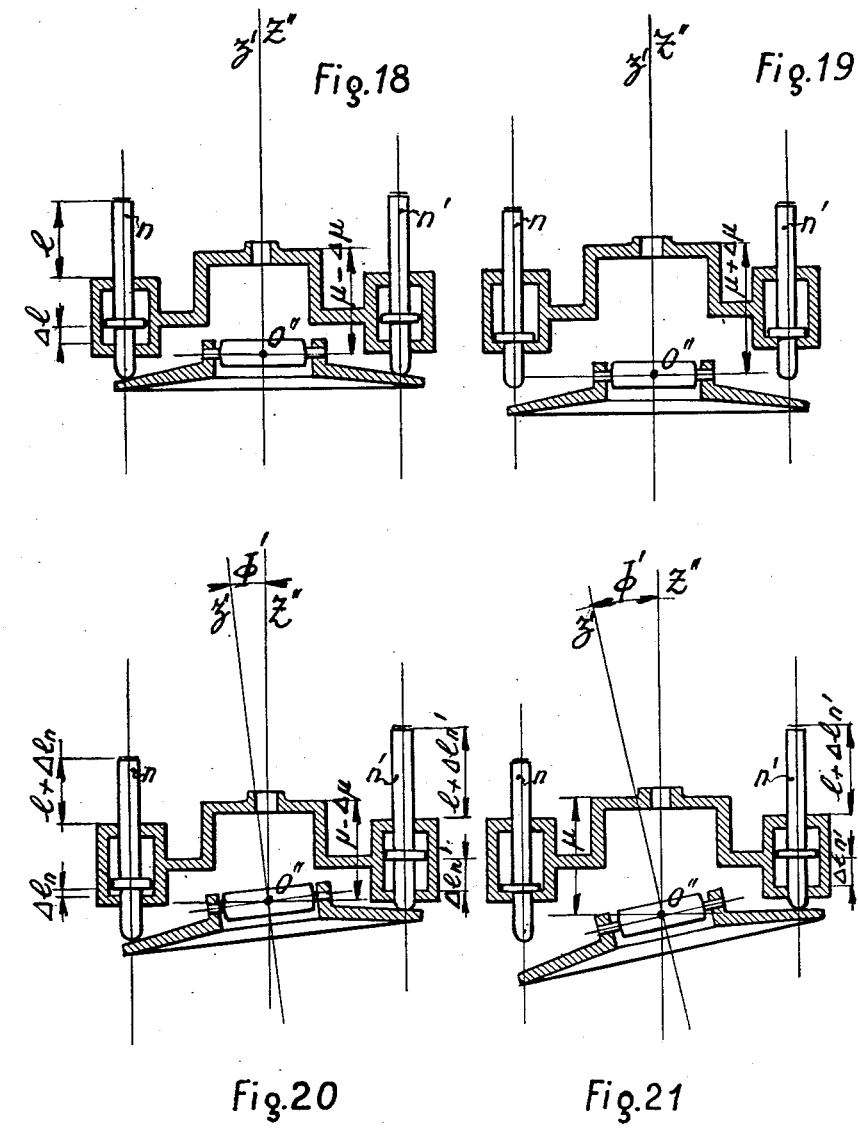

Dec. 24, 1963  G. E. CAILLETTE  3,115,318
AIRCRAFT
Filed Aug. 21, 1959  17 Sheets-Sheet 13

INVENTOR
GEORGES EDMOND CAILLETTE
BY *Brown & Seward*
ATTORNEYS

Dec. 24, 1963    G. E. CAILLETTE    3,115,318
AIRCRAFT
Filed Aug. 21, 1959    17 Sheets-Sheet 14
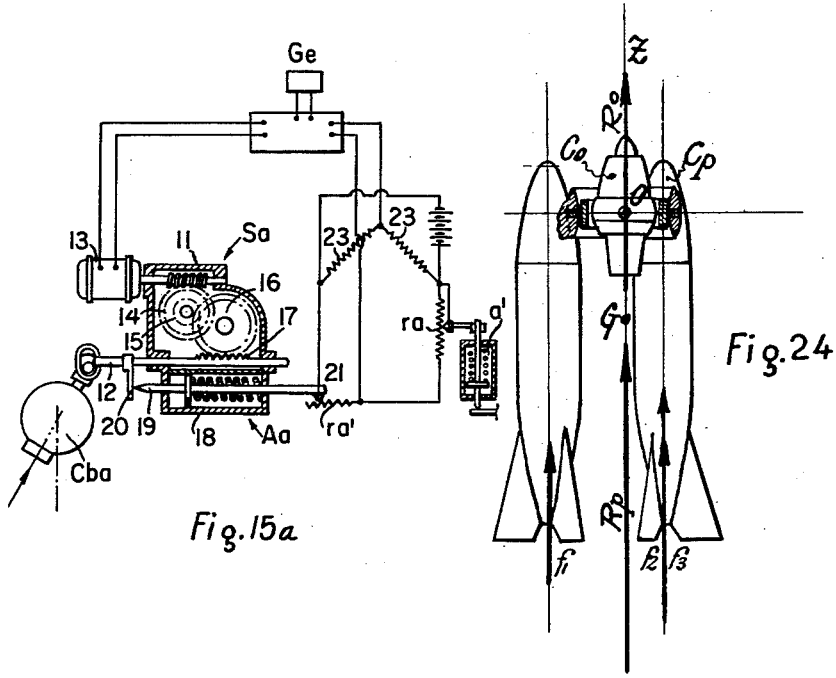
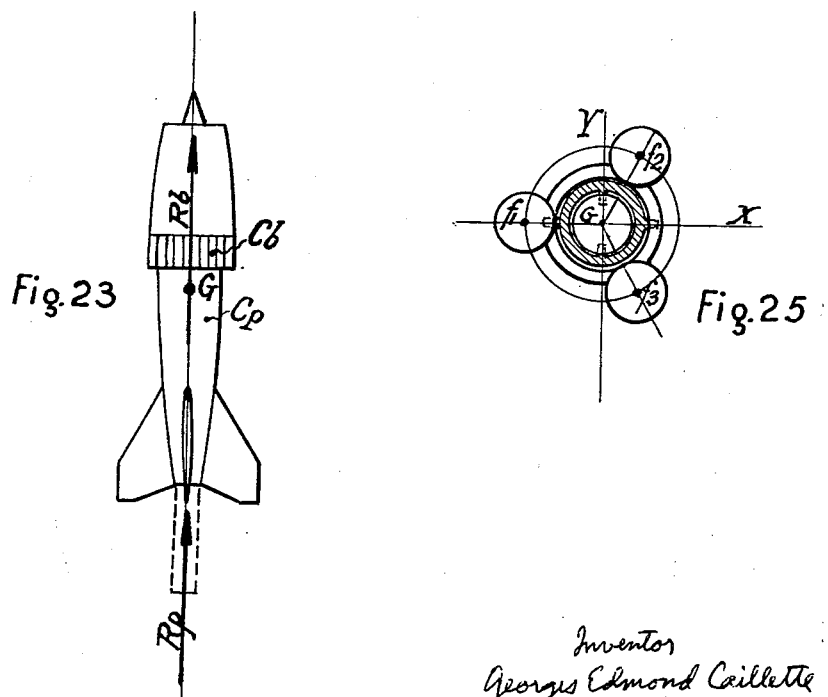
Inventor
Georges Edmond Caillette
by Brown & Neward
Attorneys Dec. 24, 1963  G. E. CAILLETTE  3,115,318
AIRCRAFT
Filed Aug. 21, 1959  17 Sheets-Sheet 16
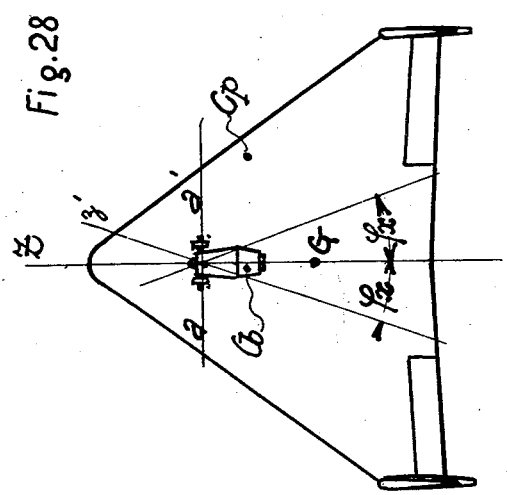
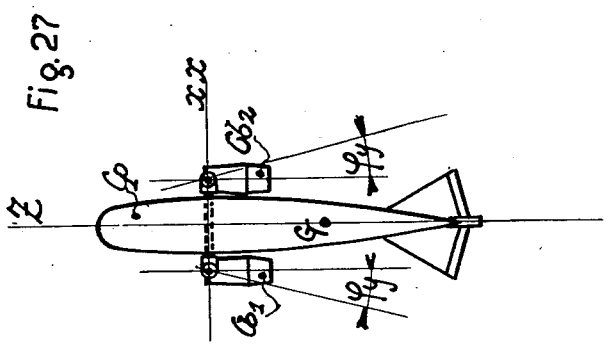
Inventor
Georges Edmond Caillette
by Brown & Seward
Attorneys Dec. 24, 1963   G. E. CAILLETTE   3,115,318
AIRCRAFT
Filed Aug. 21, 1959   17 Sheets-Sheet 17
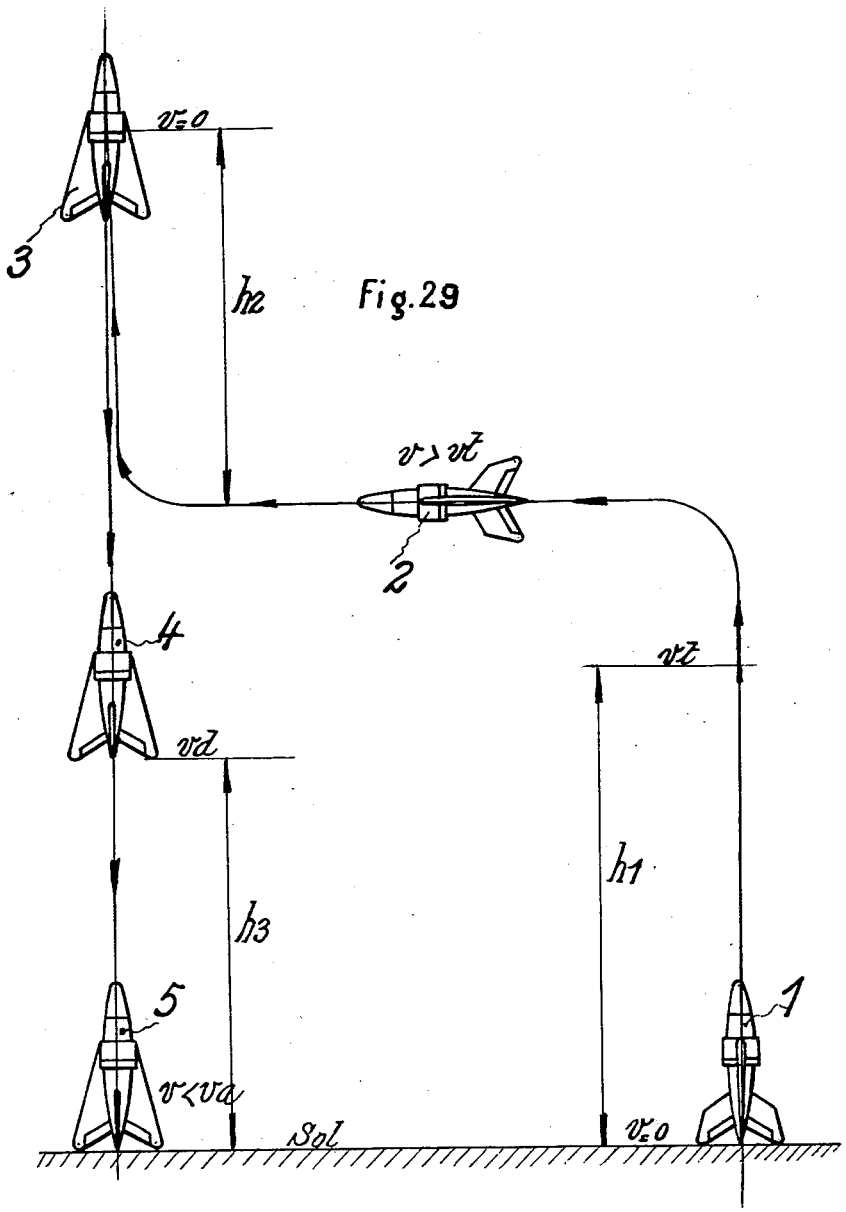

United States Patent Office 3,115,318
Patented Dec. 24, 1963

3,115,318
AIRCRAFT
Georges Edmond Caillette, 46 ter Rte. de Lourdes,
Tarbes, Hautes-Pyrenees, France
Filed Aug. 21, 1959, Ser. No. 835,366
8 Claims. (Cl. 244—77)

This invention relates to the maintenance of any desired direction of flight of rocket or jet propelled flying bodies and more particularly of aircraft including pilotless missiles utilizing jet thrust for flying both vertically and horizontally.

For the purpose of providing force of thrust as a means of propulsion as well as of directional control and maintenance of constant horizontal attitude, it has previously been proposed to mount on the fuselage of an aircraft four thrust-producing units movable each relative to the fuselage about an axis perpendicular to the roll axis of the aircraft, and to adjust said units in planes parallel to said roll axis by means of an automatic mechanism in such a manner as to compensate and nullify the effects on the aircraft's attitude as might be caused by changes in loading and balance of the aircraft in flight, outside disturbance such as gusts, or fluctuations and partial loss of thrust at one or more of the thrust-producing units. However, the ability of the automatic mechanism to compensate a large or complete loss of thrust at one of the units will depend upon an appropriate aircraft design, or upon the pilot's adjustment of the thrust of the remaining units.

It is the general object of this invention to provide a flying body with any suitable number of angularly adjustable thrust-producing units for the dual purpose of providing force of thrust as a means of propulsion and as a means of constantly maintaining any desired direction of flight.

Another object of the invention is to provide a flying body such as a dirigible aircraft with at least two thrust-producing units angularly adjustable relative to the body of the craft and to vary the speed of the craft solely by varying the angular position of the units A still further object of the invention is to provide a flying body with a plurality of thrust-producing units angularly adjustable relative to the flying body and to provide for automatic adjustment of the configuration of said units in such a manner that the resultant thrust is maintained parallel to to a given direction in space, regardless of fluctuations, partial or complete loss of thrust at one of the units.

The aforesaid objects of the invention, and other objects which will become apparent as the description proceeds, are achieved by imposing a fixed direction in space to the thrust line of a single angularly adjustable jet unit or to the resultant of a plurality of angularly adjustable jet units whereby said thrust line or said resultant is caused to intersect a predetermined axis of the flying body, in the direction of action of said thrust line or said resultant, when this axis is not parallel to said fixed direction in space to produce a turning moment on the flying body tending to bring said axis in coincidence with the direction of said thrust line or with said resultant, and consequently in parallelism with said fixed direction in space, which may be the vertical The expressions "thrust producing unit" and "reaction propulsion unit" as used herein each refer to a single jet producing motor.

The features of the invention which are believed to be novel and patentable will be pointed out in the claims appended hereto. For a better understanding of the invention reference is made in the following description to the accompanying drawings in which:

FIG. 1 is a diagram showing a flying body the predetermined inertia axis of which is out of parallelism with a predetermined direction fixed in space, the flying body being provided with means for producing a force of thrust which, in accordance with the principle of the invention, is directionally adjustable relative to said predetermined axis by adjusting said thrust producing means in planes containing said predetermined axis.

FIGS. 2, 3 and 4 show the position on dirigible crafts of various types of reaction propulsion units angularly adjustable in accordance with the invention so as to provide not only for propulsion, but also for the maintenance of a predetermined fixed direction of flight.

FIG. 10 is a diagrammatic representation of a dirigible craft in which the variations of the direction of the forces of propulsion are obtained by movable elements acting upon a reaction jet in the form of a crown.

FIG. 11 is a section taken on line 11—11 of FIG. 10.

FIGS. 12, 13 and 14 are diagrammatic representations showing the disposition of the vector forces in a dirigible craft having three reaction units.

FIGS. 15, 16 and 17 show a control arrangement for the angular position of the reaction units.

FIG. 15a represents somewhat diagrammatically a conventional electrically operated linear servo actuator of a type suitable for use in the systems shown in FIGS. 16, 17, 22 and 26.

FIGS. 18, 19, 20 and 21 show various positions of the above specified control members.

FIGS. 23, 24 and 25 show two different forms of dirigible crafts provided with means of propulsion serving also for the maintenance of any desired direction of flight.

FIGS. 26, 27 and 28 show a dirigible craft having two reaction propulsion units arranged in accordance with the invention.

FIG. 29 shows examples of trajectories of a dirigible craft the direction of flight of which is controlled in accordance with the invention.

Figure 1:
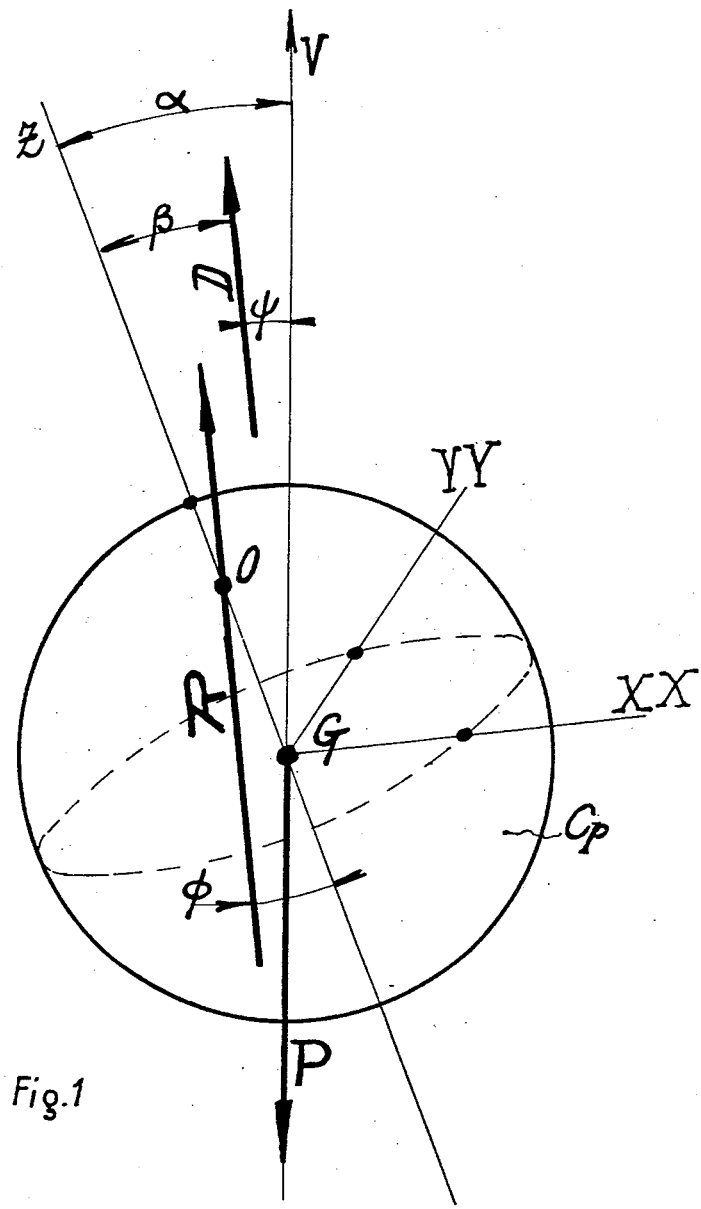
FIG. 1a is a similar diagram showing the predetermined inertia axis of the flying body in parallelism with the predetermined direction.

Referring first to FIG. 1 of the drawings, there is shown at Cp, a flying body which for simplicity of explanation has a spherical shape. The center of gravity of this body is at G.

To said body is applied, at a point O, located on a predetermined inertia axis of the body, for instance axis GZ, a force which may be constituted by a single force or by the resultant of a plurality of suitably directed forces, represented by vector R. The point of intersection O of the direction of action of said force with the axis of inertia GZ is located on said axis, ahead of the center of gravity G of the body, in the direction of action of said force.

The said predetermined axis or inertia axis is an axis of any predetermined direction, its sole characteristic being that it passes through the center of gravity.

Figure 1A:
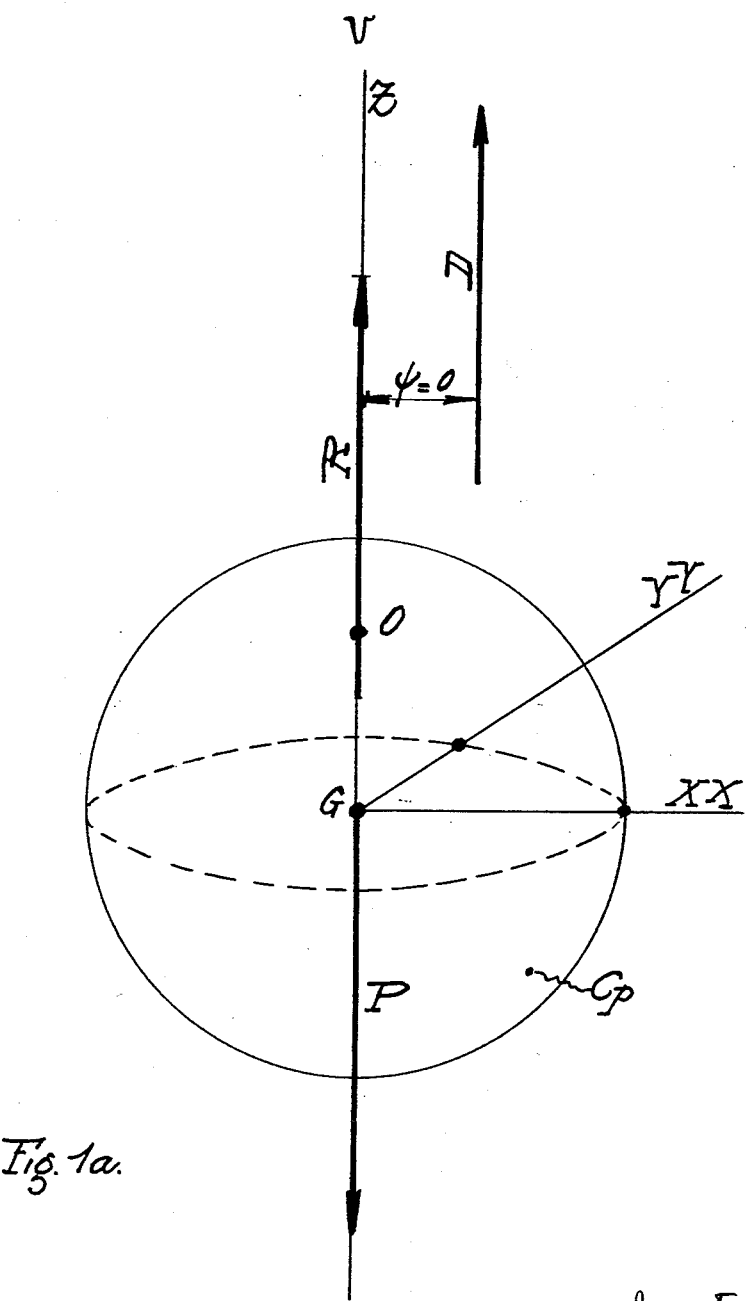

The direction of force R may be caused to align, either automatically or at the will of an operator, with a predetermined direction, indicated by way of example by vector D. Assuming that the predetermined direction D, which may form any desired angle (such as for instance the angle $\psi$ represented in FIG. 1) with the ascending vertical GV, is parallel to this vertical as shown in FIG. 1a, in which case the angle $\psi$ becomes zero, and that the action of force R is maintained in a direction parallel to the direction D, it will be understood that the direction of axis GZ which, in the absence of any other dynamical force, coincides with the direction of force R, will align with direction D, and consequently with the vertical GV, as shown in FIG. 1a. Now, if for any reason axis GZ should change its direction in respect to direction D so as to be no longer in coincidence with the direction of action of force R (as shown in FIG. 1), it will be seen that this direction of action of force R, which is maintained parallel to the predetermined direction D, will intersect the axis GZ at point O ahead of the center of gravity G whereby the force R applied at point O will produce a turning moment on body Cp which brings axis GZ anew in coincidence with the direction of action of force R. It follows that body Cp will always be brought to equilibrium if resultant R is forced to remain parallel to direction D, no matter what may be the value of angle $\psi$. FIG. 1a shows the body Cp in equilibrium.

Letting $\phi$ represent the angle formed by force R and axis GZ and $\beta$ represent the angle formed by direction D and the axis GZ, it can be seen that any predetermined relation may be established between angles $\beta$ and $\phi$, angle $\phi$ being a suitable chosen function of angle $\beta$.

The above described principle is applicable to any body, regardless of its form or shape. According to well known methods, the center of gravity of the body may be easily determined. It is only necessary to select one of all the axes which pass through the center of gravity and to dispose on the body one or more movable jet units, or any means permitting directional adjustment of the thrust line of a fixed unit or of each thrust line of a plurality of fixed units, in such a manner that in accordance with the invention, said thrust line or each of said thrust lines may be angularly displaced with respect to the body in a plane which contains said selected or predetermined inertia axis of the body whereby said thrust line will either form an angle with said predetermined axis or coincide therewith of said thrust lines either form an angle with said predetermined axis or extend parallel thereto.

It suffices then to provide means capable of detecting the orientation of the flying body in space and automatically acting on the angularly adjustable jet unit or units through the intermediate of servo-means, as this is well known in automatic systems for controlling the flight of an aircraft, in such a manner that the thrust line of the jet unit, or the resultant of the forces developed by several jet units, is caused to intersect said preternated axis of the flying body at a point located ahead of the center of gravity of the flying body in the direction of action of said thrust line or said resultant as soon as the direction of said predetermined axis does not correspond to the fixed direction in space, as this has been explained with reference to FIGS. 1 and 1a.

FIGS. 2, 3 and 4 show three embodiments of a flying body or dirigible craft of a type having a single propulsion unit.

In the embodiment shown in FIG. 2 said propulsion unit Co is constituted by a jet nozzle mounted in the body of the dirigible craft on the axis of symmetry of the latter and above the center of gravity G of the craft's body. The exhaust gas escaping from the jet nozzle and producing the reaction propulsion thrust on the craft, may be suitably directed by means of a series of deflectors d, the position of which may be controlled by a control arrangement adapted to act on said deflectors through the intermediary of suitable connecting means, in order to make the direction of thrust dependent upon a predetermined suitably chosen direction.

In the embodiment of FIG. 3 the propulsion unit is constituted by a streamlined body Co, articulated on the body of the dirigible craft Cp, at a point O located on the axis of symmetry of said body and above the center of gravity G of said body. Thus the point of application of the force is placed ahead of the center of gravity in the direction of action of said force.

In this embodiment the body of the propulsion unit Co is mounted by means of a gimbal connection on the craft's body Cp and suitable means are provided to make the angular position of said body in space dependent upon a chosen predetermined direction.

Body Co may be constituted, for instance, by a reaction unit or else by an engine provided at its upper end with two contra-rotating propellers giving a zero torque about their axis of rotation.

In the embodiment of FIG. 4 the dirigible craft Cp still is provided with a single propulsion unit mounted by means of a gimbal connection at point O, on the axis of symmetry of the craft's body and ahead of its center of gravity in the direction of action of the force of propulsion.

In this example, the propulsion unit is constituted by a reaction or jet nozzle.

In the three embodiments described above, the position of the point of application of the propulsion force O, may be made adjustable along the axis GZ by sliding the body of the propulsion unit Co at its mounting on the craft's body Cp. To this effect body Cp is provided with a cylindrical bore $a1$ the axis of which coincides with axis GZ and in which is slidably mounted the body of the single propulsion unit Co (FIG. 2), or a support $s$ therefore (FIGS. 3 and 4) whereby any conventional control means (not shown) may be provided permitting displacement of body Co within bore $a1$ to thereby adjust point O in a desired position relative to the center of gravity G of body Cp.

Figure 5:
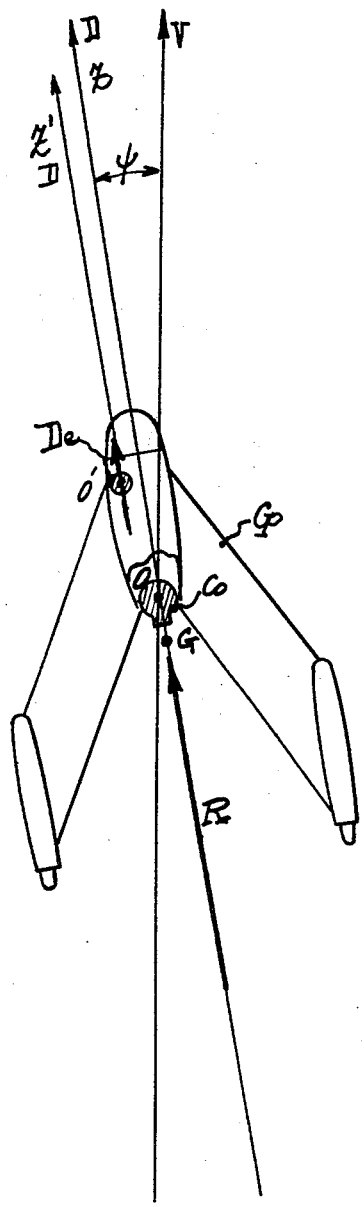
FIGS. 5 and 6 are diagrammatic representations of a flying body or dirigible craft of the type down in FIG. 4 under different conditions of flight.
Figure 6:
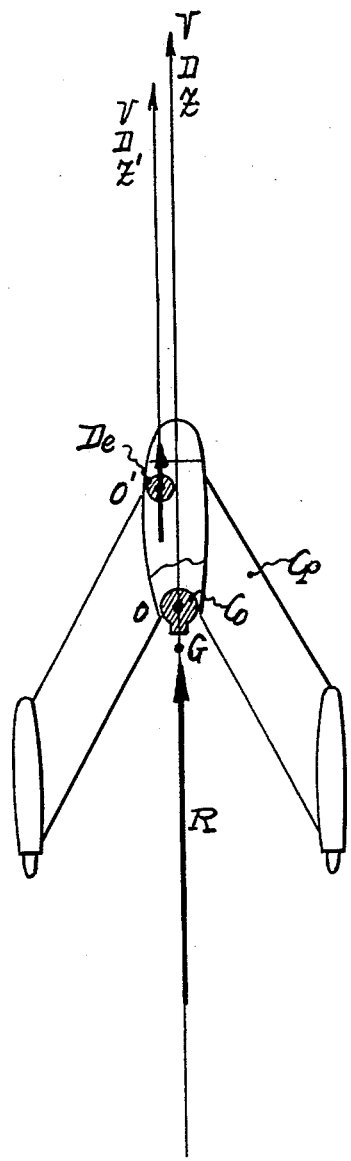
Figure 7:
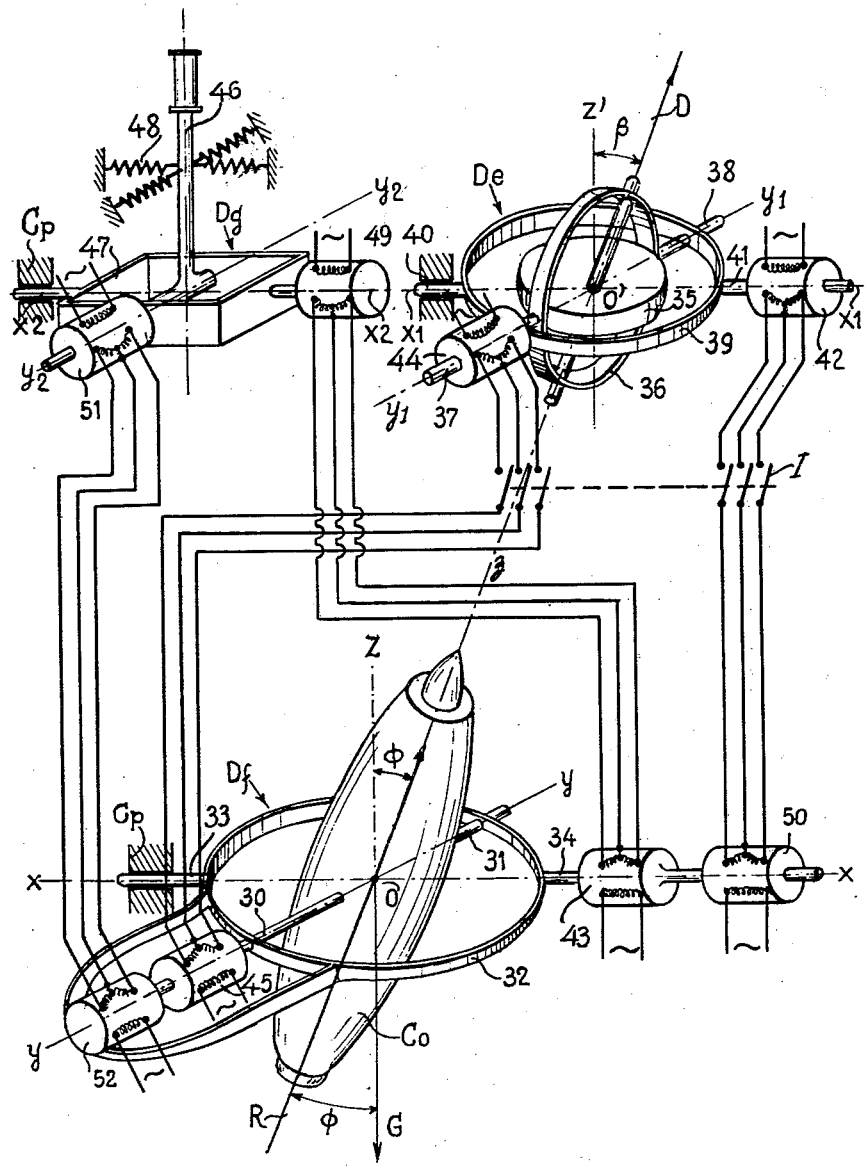
FIG. 7 shows a control system adapted to maintain the single reaction propulsion unit of the flying body shown in FIGS. 5 and 6 in a desired fixed direction.

In FIGS. 5, 6 and 7 there is shown an embodiment of the arrangement for control of the position of a single propulsion unit on the craft's body. In FIG. 5, intended to bring forth different characteristic angles, there is shown at De a pick-up device which may be, for example, of any desired gyroscopic type. One of the axis of one of the elements of this pick-up device keeps, by definition, a direction D which is fixed in space; any deviation or inclination of axis GZ with respect to direction D is adapted to cause an action which corrects the angle formed by body Co with respect to body Cp of the craft. Such corrective action may, for instance, maintain R parallel to D within the limits permitted by the construction.

There can be seen in FIG. 5 the axes, the vectors and the angles of FIG. 1.

FIG. 5 represents the body Cp in a position of equilibrium in which the angle between axis GZ and force R is nil, and FIG. 6 represents the body Cp in a position of equilibrium in which the angle between axis GZ and force R, as well as the angle between force R and vertical V is zero.

Any suitable mechanical or electrical system may be used to control the angular position of the propulsion unit Co in radial planes containing the predetermined axis of the flying body. By way of example, FIG. 7 shows an arrangement whereby the angular position of propulsion unit Co in such radial planes is made dependent upon the angular position of a pick-up device having a fixed direction with respect to the predetermined axis of the flying body, or upon the position of a manually operated lever pivotally mounted in the flying body, it being understood that such or similar arrangements form no part of the invention.

In FIG. 7, there is shown again at Co a reaction propulsion unit and at Cp body portions of a dirigible craft.

The unit Co is mounted for two degrees of freedom in a conventional bearing structure Df comprising two shafts 30 and 31 secured to unit Co at two opposite sides thereof and supported for rotation about axis y—y by a ring 32 provided with two oppositely extending shafts 33 and 34 supported in body Cp for rotation about axis x—x.

An automatic position maintaining system for unit Co comprises a conventional gyroscope De having a rotor 35 which is rotated by any suitable motor means not shown. The gyro is mounted for three degrees of freedom in a gimbal system comprising an inner gimbal ring 36 provided with two shafts 37 and 38 rotatable with ring 36 about its axis of rotation y1—y1, and an outer gimbal ring 39 provided with two shafts 40 and 41 supported in body Cp and rotatable with ring 39 about its axis of rotation x1—x1.

A tele-rotator or selsyn transmitter 42 connected with shaft 41 of gimbal ring 39 acts electrically on a selsyn motor 43 connected with shaft 34 of bearing ring 32, and a tele-rotator or selsyn transmitter 44 connected with shaft 37 of gimbal ring 36 acts electrically on a selsyn motor 45 connected with shaft 30 of the bearing structure Df. Such automatic position maintaining system may be completed by a manually operated remote control system Dg permitting to adjust at will the angular position of unit Co and comprising a hand actuated lever 46 mounted in a bearing structure 47 for two degrees of freedom about the axes y2—y2 and x2—x2, respectively, the lever 46 being normally maintained in neutral position by resilient means such as the spring 48. A tele-rotator or selsyn transmitter 49 connected to a shaft mounted on the bearing structure 47 so as to rotate about one of the axes y2—y2 and x2—x2 when lever 46 is moved from neutral position, acts electrically on a selsyn motor 50 connected to shaft 34, and a tele-rotator or selsyn transmitter 51 connected to another shaft of the bearing structure 47, adapted to rotate about the other axis thereof, acts electrically on a selsyn motor 52 connected to shaft 30 of the bearing structure Df.

The system according to FIG. 7 operates as follows:

Upon rotation of gimbal ring 39 of gyro De about axis x1—x1, a control impulse is sent from the selsyn transmitter 42 to the selsyn motor 43, causing a corresponding rotation of ring 32 of bearing Df about axis x—x, and upon rotation of gimbal ring 36 about axis y1—y1, a control impulse is sent from the selsyn transmitter 44 to the selsyn motor 45, causing a corresponding rotation of ring 32 and consequently of unit Co about axis y—y. Likewise, upon pivotal motion of lever 46 of the hand operated control system Dg from neutral about axis x2—x2, a control impulse is sent from t the selsyn transmitter 49 to selsyn motor 50, and upon pivotal motion of lever 46 from neutral about axis y2—y2, a control impulse is sent from the selsyn transmitter 51 to selsyn motor 52, said control impulses causing a corresponding rotation of unit Co about axes x—x and y—y, respectively.

The gyro De gives the parameters of the direction of a vector D fixed in space and the angle $\beta$ formed by vector D with direction O'—Z' parallel to axis GZ is resolved into two elementary components about the axes x1—x1 and y1—y1, parallel to the axes x—x and y—y.

It will be understood that the automatic control system is adapted to make angle $\phi$ dependent on angle $\beta$ in a predetermined manner. Obviously other types of servomotors may be used to accomplish the same result.

In the preceding embodiments of the invention use has been made on the craft of a single propulsion unit. However as has been pointed out previously, the invention is not limited to such a case and comprises, also, dirigible crafts in which the propulsion is produced by a plurality of propulsion units and more particularly a plurality of propulsion units adapted to product a thrust in a predetermined direction.

Figure 8:
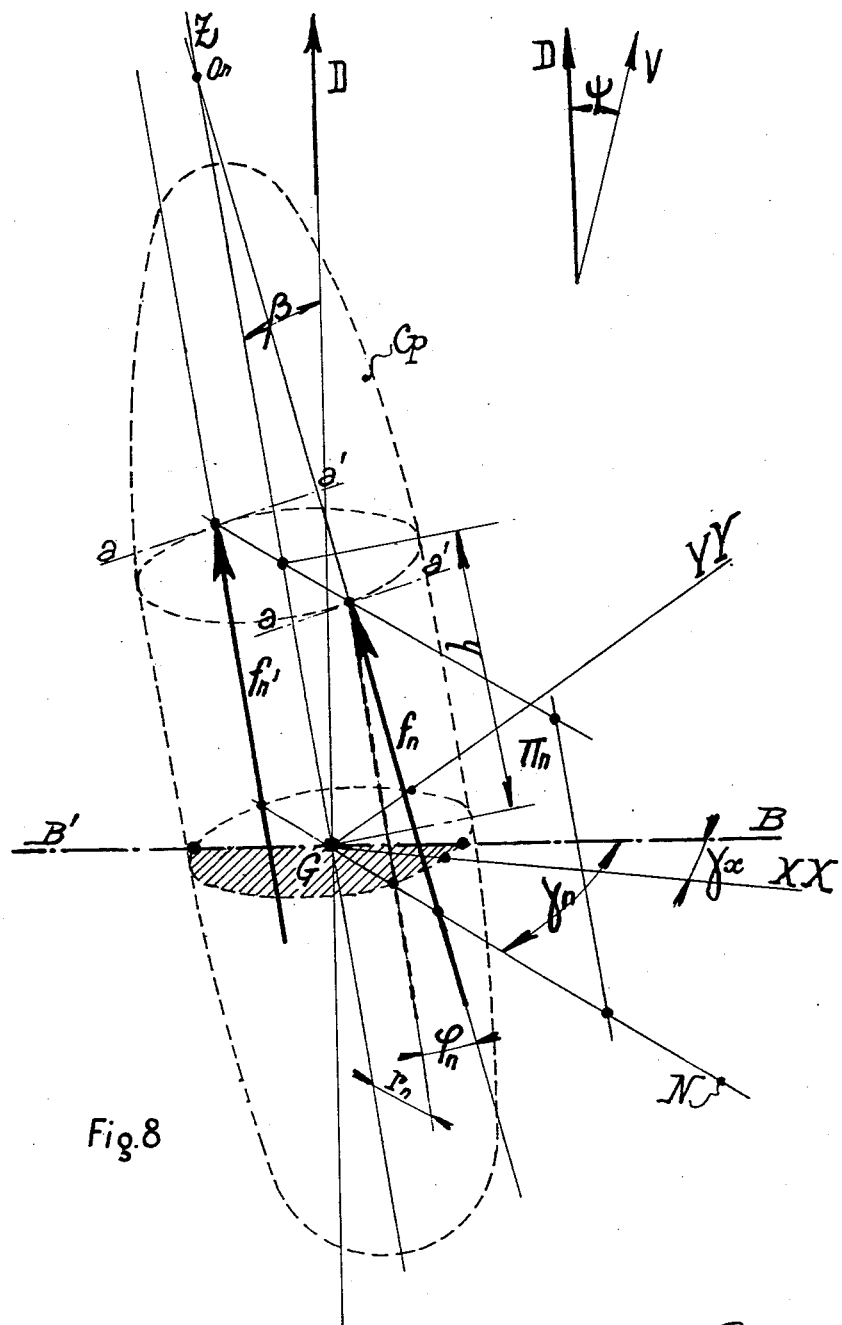
FIG. 8 is a diagram showing the disposition of each of the forces in the case of a dirigible craft provided with a plurality of propulsion units.

In the example shown in FIG. 8 there are represented diagrammatically the forces produced by two reaction units arranged on a circumference at 180° one from the other, this circumference being contained in a plane perpendicular to a chosen inertia axis of the dirigible craft, such as the axis of symmetry of the craft's body Cp.

It will be understood that such a dirigible craft may be equipped with any number of propulsion units, mounted along the above mentioned circumference with a uniform spacing for instance. FIG. 8 shows only two propulsion units in order to simplify the drawing and bring forth the principle of the effect of their inclination.

In FIG. 8 there is shown at G the center of gravity of the dirigible craft, at D a vector showing the direction to be imposed on the resultant of the forces of propulsion at GZ the axis of symmetry of the body of the craft, at XX and YY two reference axes perpendicular to each other and situated in the plane perpendicular to axis GZ and containing the center of gravity of the craft. $\beta$ represents the angle formed by axis GZ with vector D and $\psi$ represents the angle formed by vector D with the vertical.

As has been already mentioned at the beginning of the description, in order to provide a dirigible craft according to the invention, it is sufficient that the line of action of each of the propulsion forces such as fn and fn' may be separately orientated in a radial plane containing the axis of symmetry GZ of the craft's body to either intersect axis GZ at a point thereof located ahead of the center of gravity G of the craft, such as, for instance, point On or else to be parallel to said axis GZ so that the resultant of the propulsion forces applied to the aircraft either intersects axis GZ at a point located ahead of the center of gravity or coincides with said axis GZ.

The propulsion or reaction units symbolized on FIG. 8 by forces or thrusts fn and fn' produced thereby, are pivotally mounted on the body of the craft about axes aa' contained in a plane perpendicular to axis GZ and in such a manner that each vector fn or fn', for instance, may receive an angular displacement about its axis aa' while remaining in a radial plane $\pi n$ defined by axis GZ and perpendicular N passing through center of gravity G. Angle $\beta$ between axis GZ and the direction D originating from center of gravity G characterizes the angular displacement of the craft with respect to said direction about an axis BB' passing through the center of gravity G in the plane GYX. The shaded portion of this plane, shown in FIG. 8, is that which, for a given angle $\beta$, is inclined downwardly when the direction D coincides with the vertical. The forces applied to the dirigible craft pass through said plane on either side of axis BB' and are located either on the shaded side or on the opposite side.

On FIG. 8 there has been shown vector fn' parallel to axis GZ and vector fn inclined with respect to said axis by an angle $\phi n$. When vector D forms with direction GZ an angle $\beta$, the control means which determine the angular position of propulsion units become operative in such a way that the propulsion forces such as fn' passing through the non-shaded portion of plane XGY remain parallel to direction GZ, while the forces passing through the shaded portion of the same plane receive an angular displacement in the radial planes of their pivotal mountings so that the line of action of each of said forces may be made to intersect the axis GZ at a point ahead of the center of gravity G and in the direction of action of said forces, the angles formed by said forces with the axis GZ each assuming a predetermined value $\phi n$ as a function of angle $\beta$ on one hand of angle $\gamma n$ on the other hand that forms with axis BB' the corresponding perpendicular line N.

In FIG. 8 the angle $\gamma x$ defines the position of axis BB' in the plane XGY.

It will be noted that the position of axes aa' with respect to the center of gravity G is defined, on one hand, by distance h to plane XGY and, on the other hand, by the radial distance rn to the axis GZ of the point of the intersection of the propulsion force with axes aa'.

It will be understood that by a suitable choice of the value of parameters $hn$ and $rn$, it will be possible for a given limited value of angle $\phi n$ to cause the moment of the force of propulsion with respect to center of gravity G to increase with angle $\phi n$. In other words, the distance between the line of action of the force of propulsion and the center of gravity of the craft's body increases with angle $\phi n$. It will be also understood that by choosing the various parameters of the system, the number and the relative position of propulsion units, the value of angle $\phi n$ as a function angle $\beta$ and $\gamma n$, etc., it is possible to make the value of the turning moment vary as a function of the position of the axis of oscillation BB', that is, as a function of angle $\gamma x$ in order to take into account the inertia of the dirigible craft along each of its transverse, or turn and pitch axes. The system permits an infinity of combinations whereby it can be adapted for each particular case.

Figure 9A:
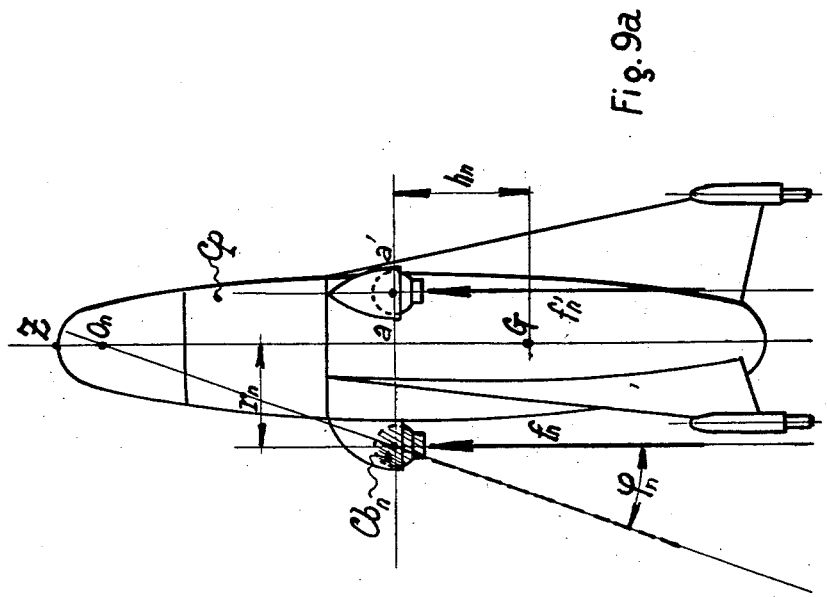
FIG. 9a is a diagrammatic representation of a dirigible craft having a three articulated jet units.
Figure 9:
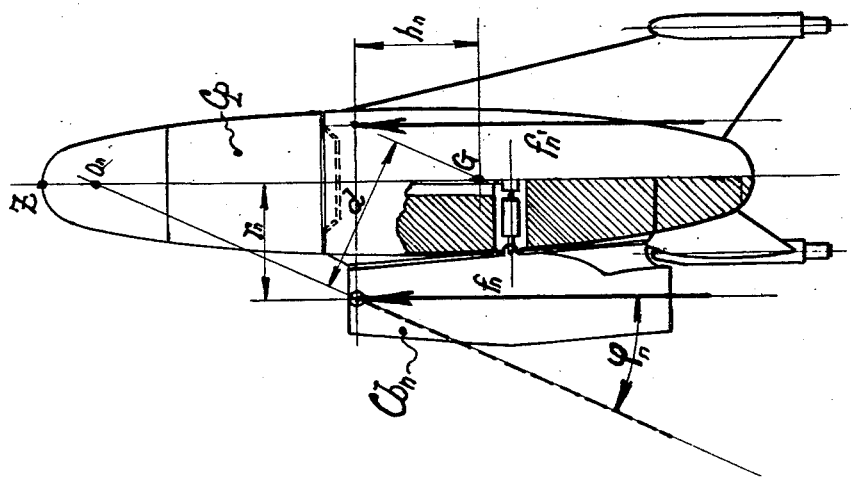
FIG. 9 is a diagrammatic representation of a dirigible craft having three articulated reaction units.

In FIGS. 9 and 9a there are shown diagrammatically two embodiments of the dirigible craft in which the craft is provided with three reaction units pivotally mounted on the craft so that each of said propulsion units can be pivoted in a predetermined radial plane with respect to the body of the craft, suitable means being provided for controlling the angular position of each of the reaction units as a function of the direction which one desires to impose on the resultant of the individual forces of said respective reaction units.

In the example shown in FIG. 9 the propulsion units are constituted by reaction units of any type whereas in the embodiment shown in FIG. 9a these propulsion units are constituted by simple jet nozzles fed by internal pressure generating devices.

In FIGS. 10 and 11 there is shown a preferred embodiment in which the independent propulsion or reaction units are replaced by an annular crown through which the propulsion gases are allowed to escape around the body of the craft in a direction controlled by means specified above. In this embodiment it is possible to distribute in a perfect manner the force supplied by each radial zone of the crown and this in a accurately predetermined manner; these zones may be defined, for instance, by radial walls of partitions. Furthermore, this solution seems to present indisputable advantages both from the point of view of aerodynamics and from the point of view of utilization of various methods of creation of a thrust.

It is understood of course that sources of thrust of any desired nature can be adopted for the purpose of this invention.

In FIGS. 12, 13 and 14 there is shown an embodiment of the invention in the form of a dirigible craft of the type comprising three reaction units pivotally mounted or attached to the body of the craft at three different points in a plane perpendicular to the axis of symmetry of the craft, said points being distributed around the axis of symmetry of the craft with a 120° angular spacing and at the same radial distance from said axis. These reaction units are adapted to be angularly adjusted about their respective axes of articulation, in the corresponding radial planes passing through the points of articulation of said units and the axis GZ.

FIG. 12 shows the dirigible craft in the conditions where axis GZ coincides with vector D.

In this example equal individual forces $f1$, $f2$ and $f3$ are inclined with respect to axis GZ by an angle $\omega$ in such a way that the three vectors $f1$, $f2$, and $f3$ intersect at a point O located ahead of the center of gravity G, on the axis of symmetry GZ. Under these conditions the line of action of the resultant R will coincide with axis GZ whatever may be the value of angle $\omega$ between zero and a limit value defined by the construction. Furthermore in this case the resultant of the propulsion forces does not exert any torque tending to deviate the dirigible craft from direction D.

On the contrary, in FIG. 13, vector D has been given a direction forming an angle $\beta$ with axis GZ.

As has been already explained with reference to FIG. 8, forces $f2$ and $f3$ remain parallel to axis GZ, whereas vector $f1$ takes such an angular position with respect to axis GZ that angle $\phi 1$ formed between said axis and said vector is a predetermined function of angle $\beta$, and at the same time of angle $\gamma 1$ formed by the radial plane in which vector $f1$ is pivoted and axis BB' about which the craft swings. In fact, considering either one of forces $f1$, $f2$, $f3$ at an angle $\psi 1$, the turning moment produced by this force with respect to the turn axis B—B', depends upon angle $\gamma 1$, that is, upon the inclination of the plane containing the considered force with respect to axis B—B'. The turning moment attains its greatest value when this plane is perpendicular to axis B—B'.

It will be noted that the resultant of the forces of propulsion passes again through point O located on axis GZ ahead of the center of gravity G, in the direction of action of said resultant. The angle $\phi$ formed between said resultant and the axis GZ is still a function of angle $\beta$.

In FIG. 14 there are shown the respective positions of forces $f1$, $f2$ and $f3$ in relation to axis GZ projected on plane $xx$, G, $yy$.

It will be understood that, according to the position in said plane of the axis of oscillation BB', the value of the turning moment will vary, for a same value of angle $\beta$, according to the value of angle $\gamma 1$. The value of the turning moment produced, for instance, by force $f2$ is zero with respect to an axis 2, but is maximum with respect to an axis 6. The axis shown in said figures are those for which the values are the same for 1, 2 and 3 on one hand and for 4, 5 and 6 on the other hand. It will be also understood that, in the case of an aircraft equipped with three or more units, it is always possible to choose the value and the respective position of the forces of propulsion developed by said units so as to vary the value of said turning moment following a predetermined law.

Referring now to FIGS. 15 to 22, these figures show the manner in which the angles of inclination of various propulsion forces may be controlled, the dirigible craft comprising a plurality of propulsion units.

In a chosen example, intended to present more clearly the invention, there is shown the case of a dirigible craft comprising eight reaction propulsion devices, $a$ to $h$, each of said devices being adapted to pivot under the action of a servo motor in a radial plane with respect to the longitudinal axis of the craft. The servo motors are separately controllable by means of plungers $a'$ to $h'$ actuated by a common control plate constituting with said plungers a distributor device adapted to operate so as to produce desired inclinations of the longitudinal axis of the aircraft.

FIG. 15a represents a conventional type of linear servo acttuator Aa—Sa comprising a body 11, a reciprocable rod 12 guided in body 11 for longitudinal movement, and a reversible electric motor 13, the rotary movement of which in either direction is transmitted to rod 12 by a gear train 14, 15, 16 mounted in the body 11 and meshing with a rack 17 formed on the rod 12. The actuator further comprises a servo element Aa constituted by a cylindrical body 18 adapted to guide a spring loaded follower for longitudinal movement. The follower 19 is constantly urged towards an arm 20 on rod 12 so as to move in unison therewith and carries on its free end the movable contact piece 21 of a variable resistance $ra'$. The actuating rod 12 is connected to the propulsion unit Cba to move the same in a radial plane with respect to the longitudinal axis of the craft and in correspondence with the control motions of plunger $a'$, the servo control being effected by means of a conventional Wheatstone bridge which, as usual, comprises two parallel resistance branches, one branch including two fixed resistances 22 and 23 in series, and the other branch including the two variable resistances ra and ra' in series. It will readily be understood that motor 13 will be energized to position the rod 12 and consequently unit Cba in response to signal voltages resulting from any unbalance in the Wheatstone bridge due to variations of resistance ra controlled by plunger a', the follower 19 adjusting the resistance ra' so as to return the Wheatstone bridge to balanced condition in which motor 13 is deenergized.

FIGS. 16 and 17 are two sections at a right angle illustrating the principle of the distributor.

Figure 22:
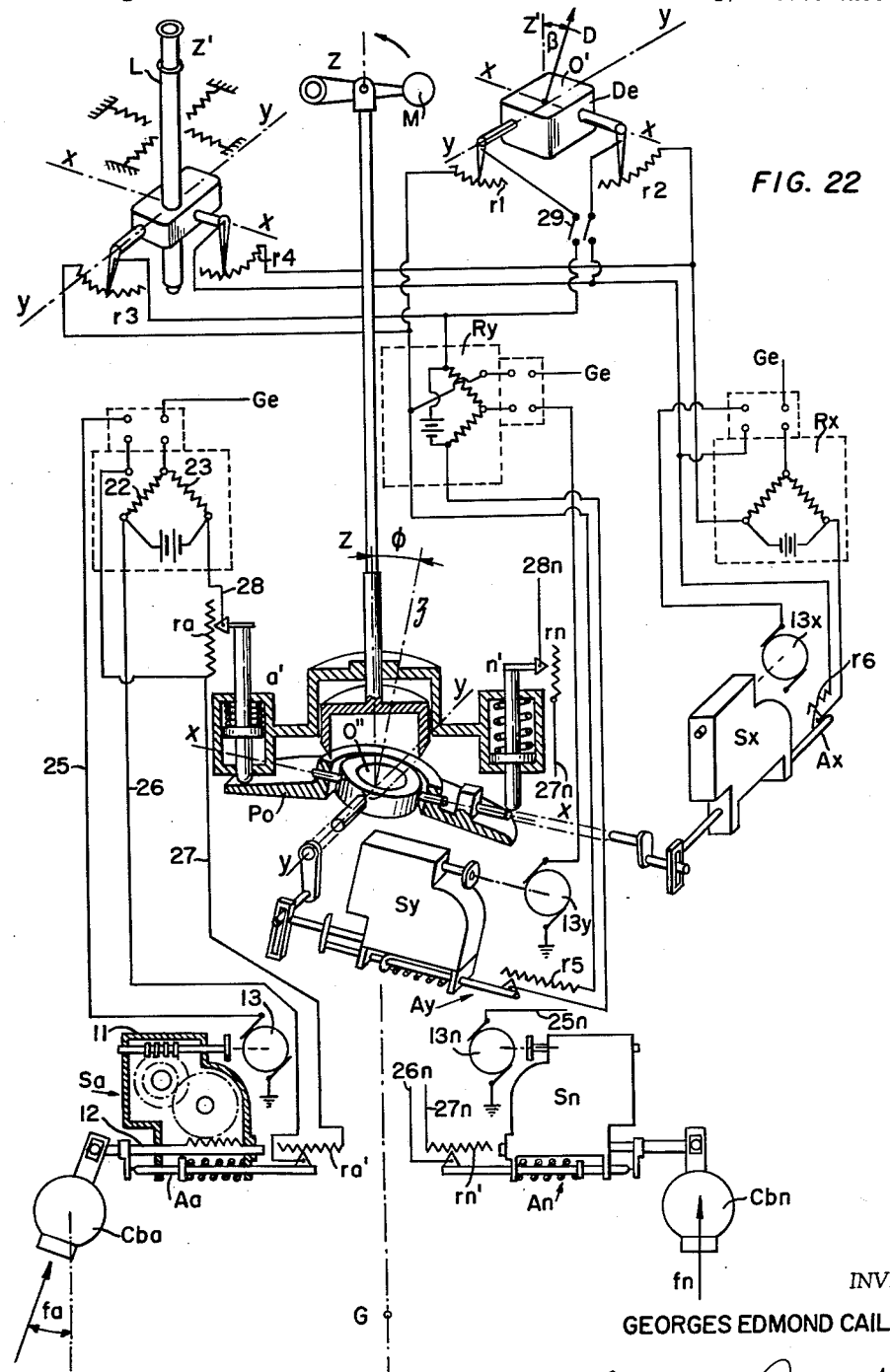
FIG. 22 shows diagrammatically, in a general way, the follow-up control of the propulsion units in a dirigible craft having a plurality of propulsion units.

FIGS. 18 to 21 show various positions of the control plate and FIG. 22 shows a general layout of the installation.

Referring to said figures, it will be seen that the control plate Po is pivotally mounted about point O", so that it may take any angular position about said point, under the action of its control system. The distributor body may be mounted on the craft in any desired position. The angular position of control plate Po, about point O", is controlled by two actuators Sx—Ax and Sy—Ay mounted to pivot plate Po about two mutually perpendicular axes x—x and y—y, each actuator being of the type shown in FIG. 15a. It will be understood that this control plate may be adjusted from its neutral position, in which its axis O"—z' coincides with the longitudinal axis GZ of the aircraft to any given angular position, in which its axis O"—z' forms, with said longitudinal axis GZ an angle $\phi'$, dependent upon angle $\beta$, thereby to move a number of plungers a' to h', bearing against its surface, at uniformly distributed points, as shown in FIG. 15. In other words, plunger d', for instance, is positioned so that the angle formed by the pivot axis of the control plate with the plane passing through O"—z' and the axis of plunger d' is equal to the angle $\gamma n$ formed by the axis B—B' with the plane containing the force produced by the propulsion unit d. The above mentioned plungers are pressed toward said control plate, by suitable resilient means. In each position of the control plate, the stroke $\Delta l$ of each plunger, is a function at the same time, of angle $\beta$ and angle $\gamma n$ defining the position of the radial plane, in which this plunger is located, with respect to the axis of inclination of the plate.

FIG. 22 shows a general layout of the control system for the angular position of the propulsion units, diagrammatically indicated in Cba and Cbn. FIG. 22 includes servo actuators of the type shown individually in FIG. 15a which may be regarded as being the actuator Sa—Aa with its associated circuit. Wires connecting in motor 13 and relay ra' in an appropriate manner to the Wheatstone bridge 22, 23 and relay ra are designated 25, 26, 27 and 28. Corresponding elements of the actuator Sn—An and its associated circuit are designated by the reference numerals 13n, 25n, 26n, 27n and 28n.

Similarly to the example of FIG. 7, the control system comprises an automatic reference direction detector device De which may be for instance, of a gyroscopic type, and a manually operated device comprising the control stick L device, these two devices being adapted to be simultaneously connected into the servo control circuits for the actuators Sy—Ay and Sx—Ax. The control circuit for actuator Sy—Ay comprises a conventional Wheatstone bridge system Ry including a variable resistance r3 adjusted in correspondence with the control motion of stick L about axis y—y, and a variable resistance r5 connected in series with resistance r3 and adjustable in correspondence with the controlled motion of servo element Ay. The control circuit for actuator Sx—Ax likewise comprises a conventional Wheatstone bridge system Rx the variable resistance r4 of which is adjustable in correspondence with the control motion of stick L about axis x—x, and the variable resistance r6 of which is adjustable in correspondence with the controlled motion of servo element Ax. The two variable resistances r1 and r2, which have the same function as resistances r3 and r4 and which are adjustable in correspondence with the control motion of the automatic detector device De may be connected to the corresponding Wheatstone bridge systems Ry and Rx by means of a switch 29. Actuator Sx—Ax is driven by a reversible electric motor 13x in accordance with the signal voltages introduced in an amplifier (not shown) on any unbalance of the Wheatstone bridge system Rx, and actuator Sy—Ay is driven by a reversible electric motor 13y in accordance with the signal voltages introduced in another amplifier on any unbalance of the Wheatstone bridge system Ry, the electric motors 13x and 13y being fed from a source Ge under the control of the corresponding amplifier.

By examining FIG. 22, it will be understood that the control plate Po will be controlled in the same manner as the body of the propulsion unit, shown in FIG. 7. This control plate is adapted in its turn, as shown in FIG. 15, to act on a given number of plungers a' to n', which latter control respectively a corresponding number of actuators such as Sa—Aa and Sn—An, adapted to impart a predetermined angular displacement to the corresponding reaction propulsion devices, such as Cba and Cbn in the respective radial planes in which said devices are pivotally mounted. The variation $\Delta l$ (see FIGS. 18 and 20) in the position of respective plungers a', n' under the action of the control plate may be used to vary the value of resistors such as ra and rn, producing a desired current variation controlling the operation of said actuators in the same manner as described with reference to FIG. 15a.

FIGS. 18 to 21 show various cases of the control action. It will be noticed also, in FIG. 22, that the point O" of pivotal mounting of the control plate Po is adapted for displacement along the axis of symmetry O"Z" of the distribution device comprising the plate Po and the plungers a' to h', under the action of a suitable control. In fact an additional control lever M is provided for varying the length $\mu$ of the axial displacement of point O" as indicated on FIGS. 18 to 21 and thus impart simultaneously to all the plungers a translation movement of a value equal to $\pm \Delta \mu$. This results in a simultaneous actuation of all the reaction propulsion units, causing a widening of the beam of forces with a consequent variation of the value of the resultant of said forces as a function of the cosine of the angle of inclination of said forces with respect to axis GZ. Thus an adjustment of the total thrust may be effected with great accuracy.

It will be understood, that in this way all reaction propulsion units may be actuated simultaneously by displacing point O". On the other hand by adopting the angular position of the control plate, about its point of pivotal mounting O", the reaction propulsion units may be differentially actuated.

FIG. 18 shows the control plate in the position in which it has been moved upwardly over a certain distance $-\Delta \mu$, so as to produce a predetermined widening of the beam of forces defining a condition of stable equilibrium.

FIG. 20 shows the control plate in an angular position in which its axis O"—z' makes an angle $\phi'$ with respect to axis O"Z" of the distributor, to which position it has been moved from the position shown on FIG. 18. Thus, after a certain widening of the beam of forces has been effected, the direction of the resultant may be varied by changing the angular position of the control plate.

On the contrary in FIG. 19, the point O" having been displaced over a distance $+\Delta \mu$, the control plate is shown in the position in which no action is exerted on the reaction units as long as the craft has not taken a certain inclination. The reaction propulsion units remain in such a case parallel to axis GZ.

In the position shown in FIG. 21 the control plate is acting on a number of plungers and hence effects an angular adjustment of the reaction propulsion units. This action is the result of th inclination of the control plate from its neutral position shown in FIG. 19 and in view of the clearance left between the plate and the plungers in said neutral position, this action takes place only after a certain inclination has been imparted to the control plate. Thus a direction imposing control is produced only if the inclination exceeds a predetermined value. Such arrangement is desirable, for instance, in the case where the craft's stability is maintained aerodynamically within a predetermined inclination of the control plate but needs to be controlled beyond said inclination.

In this way the stabilizing system is effective only upon inclination exceeding a predetermined angle.

FIG. 23 shows an embodiment of the invention in which the dirigible craft is provided with a propulsion unit of fixed direction Rp arranged following the axis of symmetry of the craft, on one hand, and with a crown of propulsion units Cb, adapted to be controlled by the means described above so as to produce a resultant propulsion force Rb of controllable direction and strength. The fixed propulsion unit may be constituted by a take-off rocket.

Another embodiment of the invention is shown in FIG. 24. In this case propulsion forces of fixed direction f1, f2 and f3 and giving a resultant Rp, are produced by a plurality of propulsion units evenly distributed about the periphery of the craft's body, whilst a controlled force Ro is produced by a single propulsion unit Co pivotally connected to the aircraft Cp at a point O located on the said predetermined axis which in this case is the axis of symmetry GZ of said aircraft and ahead of the center of gravity G of the craft in the direction of said force.

FIG. 25 shows a plan view of the dirigible craft of FIG. 24.

It must be understood that the invention is not limited to the various embodiments that have been described and illustrated and that various combinations of propulsion units, of fixed or variable direction, can be made without departing from the scope of the invention defined in the claims, the condition to be fulfilled being always to have the resultant of propulsion forces applied to the craft's body at a point located on a predetermined axis of said body and ahead of its center of gravity, in the direction of action of said resultant, said resultant being on the other hand, constrained to maintain a predetermined direction.

Various cases have been examined in the preceding description, but in all the cases in which the craft is provided with a plurality of propulsion units, the number of said units is at least equal to three. In fact this arrangement is required in accordance with the principle of pivotal mounting of propulsion units, that has been adapted in accordance with FIG. 8, in order to achieve the stabilization of a dirigible craft in all positions of axis BB' in the plane XGY.

It is possible however to provide a dirigible craft according to the invention with only two propulsion units. In such a case these units are arranged is two diametrically opposite positions symmetrically located with respect to a desired axis of symmetry.

Figure 26:
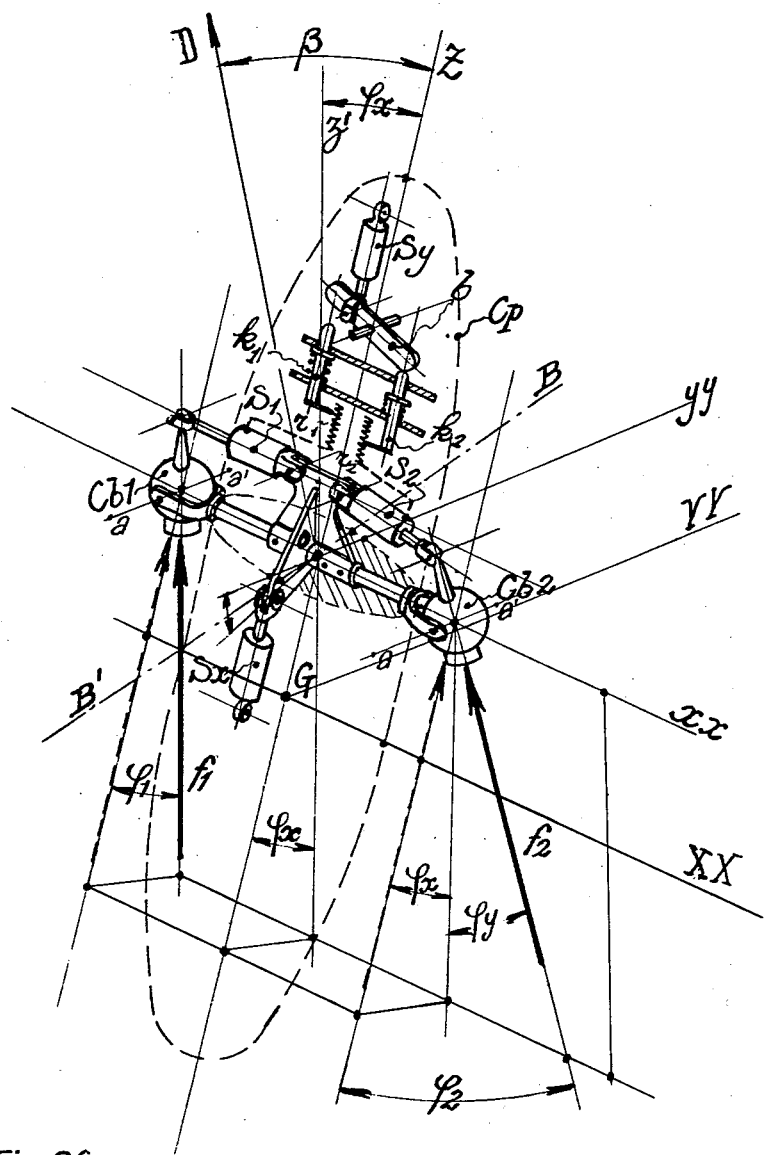

Such an embodiment is shown in FIG. 26, while FIGS. 27 and 28 show an application of such a system in an aircraft of flying wing type.

Referring to FIG. 26 which for the purpose of explanation was simplified as much as possible, there is shown at Cb1 and Cb2 two reaction propulsion units pivoted about parallel axes a—a' and linked to a common shaft, which coincides with an axis xx of the craft's body, intersecting axis GZ at a point located ahead of the center of gravity of said body, in the direction of action of the resultant of the forces of propulsion. This shaft is adapted to rotate about its axis so as to rotate about the same axis, in one or in the other direction, the assembly of the two reaction propulsion units. Thus each reaction propulsion unit, in the same way as in the preceding embodiments, has a single degree of liberty, following $\phi y$ and is angularly movable in the radial plane in which it is mounted. However in this embodiment the two reaction propulsion units are angularly adjustable in the same plane, whilst this plane itself is adapted to receive angular displacement $\phi x$ about the axis of the shaft connecting together the axes $aa'$ of pivotal mounting of the two reaction units. In this way a second degree of liberty is conferred on the reaction propulsion units which permits creating the conditions of stable equilibrium for the craft having only two reaction propulsion units.

Each of the reaction propulsion units is subjected to the control of a reference pick-up device such as described with reference to FIG. 22. The system comprises in the present embodiment, a servo motor Sx adapted to impart angular displacement $\phi x$, to the shaft which carries the two reaction propulsion units, and two servo motors S1 and S2 adapted to pivot or angularly adjust the reaction propulsion units Cb1 and Cb2 respectively, about their corresponding axes of pivotal mounting $aa'$, following $\phi y$. These latter servo motors S1 and S2 are in their turn selectively controlled, by a servo motor Sy subjected at the same time as servo motor Sx, to the control of the reference pick-up device. The plate such as described with reference to FIG. 22, is replaced in this example, by a double arm rocking lever b adapted to press against one or the other of two thrust plungers k1 and k2 each controlling by its position a potentiometer, respectively r1 and r2 so as to vary the current which feeds servo motors S1 and S2 respectively, by the intermediary of relays, which for simplicity have not been illustrated.

If the reaction propulsion units are to be moved about their respective axes, for a same angle, the two arm rocking lever b is displaced as a whole along the axis GZ under action of control means, not shown, but similar to those used for controlling the control plate in the embodiment described with reference to FIG. 15 to 22.

It will be noted that in the embodiment of FIG. 26, when one of the reaction propulsion units under the action of its servo motor, is inclined with respect to the axis GZ, so that it takes with respect to said axis, an angular position differing from that taken with respect to the same axis by the other reaction propulsion unit, the resultant of the two forces does not coincide any more with said axis. However, the craft will be still maintained in the conditions of a stable equilibrium, as the craft's body will be angularly urged about its center of gravity in such a direction that will bring the resultant of the forces of propulsion back into coincidence with axis GZ. In other words, due to the very principle of the servo mechanism, the resultant of the two propulsion forces will separate from axis GZ only when the direction of this axis deviated from the predetermined direction whereby a turning moment will be created under the effect of which the axis GZ returns into coincidence with the predetermined direction and the propulsion units into their normal position.

The embodiment of FIG. 27 is more particularly applicable to dirigible crafts having the shape of a flat body, in which case the two reaction propulsion units may be mounted on either side of the plane of symmetry of said flat body. An example of such an application of the invention is shown in FIGS. 27 and 28.

In these figures there is diagrammatically represented an aircraft of the "flying wing" type. The flying wing is indicated at Cp with two reaction units Cb1 and Cb2 mounted on either side of the plane of the wing.

FIG. 29 illustrates a few characteristic elements of trajectories that may be followed by a dirigible craft and more particularly an aircraft equipped according to the invention and provided with suitable supporting surfaces.

The dirigible craft, for instance, may climb vertically and return to the ground with a speed approaching the zero value, as can be seen at 5. By taking off from the ground at a speed very near to the zero value, the aircraft may climb vertically up to an altitude at which its speed attains a value $vt$ or transition speed for which its stability is maintained by its own aerodynamical elements; the stability of the craft between the ground and said altitude (or between $v=0$ and $v=vt$) being achieved by the means according to the invention as has been explained hereinabove. The altitude $h1$ required for attaining the speed $vt$ is comparable to the take-off distance for a normal aircraft.

After speed $vt$ has been attained the aircraft can follow any trajectory depending on its characteristics and aerodynamical means, without constantly resorting to the stabilizing means according to the invention. At 2 there is shown an aircraft having a sufficient lift to enable it to follow a horizontal trajectory for a speed $v$ exceeding the above mentioned speed $vt$. The aircraft is capable of resuming a vertical flight from any such trajectory, as shown at 3. While on a vertical trajectory the craft is provided with means permitting changing its speed and in particular reducing the speed below said transition value $vt$, in which case the automatic system of stabilization according to the invention will again become effective; said system will produce its action for all the intermediate values of the speed including the zero value corresponding to the stationary flight condition. In such condition the craft will remain motionless in the air in a position close to the vertical, depending on the secondary aerodynamical forces due, for instance, to the motion of the surrounding atmosphere. One can consider as a characteristic of the craft the minimum vertical distance $h2$ required for passing from speed $v$ or $vt$ to zero speed. The height $h2$ thus attained, will depend only on the variations imposed on the force of propulsion and the braking means used.

Moreover, the speed of descent, of the craft should be reduced from the moment the craft is at a minimum distance $h3$ from the ground (see position 4), said distance being dependent on the speed decreasing means provided on the craft and its forces of propulsion acting in opposition to those of the gravity, in such a manner that the aircraft lands with a speed $va$ mentioned above.

Any desired rotation of the aircraft about axis GZ may be easily produced and controlled, by auxiliary means, controlled jets or deflectors and, at suitable speeds, by aerodynamical members or elements.

The means according to the invention for maintaining a desired direction of flight, are applicable to a great variety of dirigible crafts which, according to their general structural and aerodynamical characteristics, may fall in one of the following three categories:

(1) Aircraft without lifting surfaces, capable of effecting vertical trajectories, with imposed lateral drift (i.e. adapted to be moved laterally with respect to the vertical axis by an auxiliary force). Examples: slow apparatus for life saving, observation devices, aerial mines with explosion controlled by "proximity fuses" or otherwise, etc.

(2) Aircraft with slight lifting capacity but streamlined and provided with control surfaces in such a way that they can effect the evolutions of the semiballistic type. Examples: guided or telecontrolled missiles, rockets having the possibility of stationary flight in altitude and the possibility of a normal return to ground.

(3) Aircraft having a sufficient lifting capacity in order to effect normal aerodynamical evolutions for the speeds exceeding a certain value. Examples: armed interceptors possessing the following advantages: considerable saving in weight and in drag by the reduction of the wing surface, simplification of the same, simplification of controls, elimination of the landing gear (the latter being reduced to damping cylinders), and the possibility of low landing speeds permitting limiting the weight of said shock absorbers, the possibility of having the pilot standing at the take-off and in the stationary flights, which improves the visibility, and lying flat in case of a horizontal flight, the latter position being recognized as favorable for resisting accelerations due to the curvature of the trajectories and making possible reduction of the over-all cross section of the craft.

In all the cases that have been described, the resultant R of the forces of propulsion was implicitly assumed to attain a value higher than weight P of the dirigible craft which is fully possible with rocket devices or with modern reaction propulsion motors now known to be capable of giving thrusts of the order of 4 times their weight and which can be adjusted with an accuracy of $\frac{1}{100}$ of its value. However, this assumption does not exclude the possibility of applying the principle of the invention to aircraft on which the forces of sustentation intervene or will be controlled in a similar manner. In this last case the value of the resultant of the forces of propulsion could eventually become inferior to the weight of the craft.

What is claimed is:

1. In a flying body, at least one jet reaction nozzle positioned on said body so as to provide a forward thrust to said body at a point located ahead of the center of gravity thereof, said nozzle being angularly adjustable relative to said body in a radial plane containing the center line of the body, and means for adjusting said nozzle to and maintaining said nozzle in an angular position in which said forward thrust is in parallelism with a predetermined fixed direction in space.

2. In a flying body, a single jet reaction nozzle as a means of propulsion and as a means of automatic maintenance of any desired direction of flight, said nozzle being universally mounted on said body about a point on a predetermined axis of said body passing through the center of gravity thereof, said point lying ahead of said center of gravity in the direction of propulsion, means sensitive to the direction of said axis in space, and means for constraining under the control of said direction sensitive means the angular position of said nozzle about its point of articulation, to be dependent upon a predetermined fixed direction in space.

3. In a dirigible aircraft having a body, a jet reaction nozzle universally mounted on said body about a point on a predetermined axis of said body passing through the center of gravity thereof, said point lying ahead of said center of gravity in the direction of propulsion, controlled means operative at will by the pilot of the craft, means sensitive to the direction of said axis in space, means for constraining under the control of said direction sensitive means the angular position of said nozzle about its point of articulation, to be dependent upon a fixed direction in space, and means for constraining said angular position of the nozzle to be dependent upon the adjustment of said controlled means.

4. In a flying body, a system for adjusting and maintaining any desired direction of flight, said system comprising at least one jet reaction nozzle positioned on said body in such a manner with respect to a predetermined axis of said body passing through the center of gravity thereof that the thrust produced by said at least one jet reaction nozzle, coincides with said axis to thereby apply a forward thrust to said body at a point located ahead of said center of gravity, in the direction of action of said forward thrust, means for directionally adjusting the thrust of said at least one jet reaction nozzle in a radial plane containing said axis so that said direction of action of the forward thrust is caused either to be parallel to said axis or to intersect the same at a point located ahead of said center of gravity, and means for controlling said adjustment so as to maintain said direction of action of the forward thrust in parallelism with a predetermined fixed direction in space, whereby said direction of action of the forward thrust will intersect said axis when the latter is not parallel to said predetermined direction to thereby produce a turning moment on said body tending to bring said axis in parallelism with said predetermined direction.

5. In a flying body, a system providing force of thrust as a means of propulsion and as a means of automatic maintenance of any desired constant direction of flight, said system comprising a jet reaction nozzle positioned in such a manner on a predetermined axis of said body passing through the center of gravity thereof that the thrust line of said nozzle coincides with said axis to thereby apply a forward thrust to said body at a point located ahead of said center of gravity, in the direction of action of said forward thrust, means for directionally adjusting said thrust line in any radial plane containing said axis so that said direction of action of the forward thrust is caused to intersect said axis at said point, and means for controlling said adjustment so as to maintain said direction of action of the forward thrust parallel to a predetermined constant direction in space.

6. In a dirigible craft having a body, a plurality of thrust producing units each pivotally attached to said body and arranged with respect thereto in such a manner that its thrust line is directionally adjustable in a plane containing a predetermined axis of the body passing through the center of gravity thereof, and that the resultant of the force of thrust produced by said units coincides with said axis when the thrust lines of said units are parallel or equally and symmetrically inclined with respect thereto, and means for varying the angle formed by said thrust lines and said axis, in such a manner that this angle may be given a desired value between zero and a predetermined value, in a single direction and namely that in which the point of intersection of the thrust lines of individual thrust producing units with the said axis takes a suitable position in the direction of flight ahead of the center of gravity.

7. In a dirigible craft, a system providing force of thrust as a means of propulsion and as a means of automatic directional control, said system comprising at least two thrust propulsion units each pivotally attached to said body and arranged with respect thereto in such a manner that its thrust line is directionally adjustable in a plane containing a predetermined axis of the craft passing through the center of gravity thereof, and that the resultant of the propulsion forces produced by said units coincides with said axis when the thrust lines of said units are parallel or equally and symmetrically inclined with respect thereto, and means for varying the angle formed by said thrust lines and said axis with said thrust lines remaining equally inclined with respect to said axis to thereby vary the force of thrust applied to said body in the direction of flight, or for varying the angle formed by the thrust line of individual units and said axis to thereby cause said resultant to intersect said axis at a point located ahead of said center of gravity, in the direction of propulsion.

8. In a flying body, at least one jet reaction nozzle positioned on said body so as to provide a forward thrust to said body at a point located ahead of the center of gravity thereof, each nozzle being angularly adjustable between such limits relative to said body in a radial plane containing the center line of the body that, in all positions of said nozzle between said limits said center line has always a point in common with a point of the thrust line of said nozzle, and means for adjusting said nozzle to and maintaining it in an angular position between said limits in which said forward thrust is in parallelism with a predetermined fixed direction in space.

References Cited in the file of this patent
UNITED STATES PATENTS

| | | |
|---|---|---|
| 1,852,927 | Hall | Apr. 5, 1932 |
| 2,176,476 | Twining | Oct. 17, 1937 |
| 2,472,839 | Kramer | June 14, 1949 |
| 2,552,359 | Winslow | May 8, 1951 |

---

UNITED STATES PATENT OFFICE
CERTIFICATE OF CORRECTION

Patent No. 3,115,318                 December 24, 1963

Georges Edmond Caillette

It is hereby certified that error appears in the above numbered patent requiring correction and that the said Letters Patent should read as corrected below.

Column 1, before line 8, insert the following paragraph:

This application is in part a continuation of my copending application Serial No. 300,463, filed July 23, 1952.

Signed and sealed this 13th day of August 1968.

(SEAL)
Attest:

Edward M. Fletcher, Jr.

Attesting Officer

EDWARD J. BRENNER

Commissioner of Patents

UNITED STATES PATENT OFFICE
CERTIFICATE OF CORRECTION

Patent No. 3,115,318 December 24, 1963

Georges Edmond Caillette

It is hereby certified that error appears in the above numbered patent requiring correction and that the said Letters Patent should read as corrected below.

Column 1, before line 8, insert the following paragraph:

This application is in part a continuation of my copending application Serial No. 300,463, filed July 23, 1952.

Signed and sealed this 13th day of August 1968.

(SEAL)
Attest:

Edward M. Fletcher, Jr.
Attesting Officer

EDWARD J. BRENNER
Commissioner of Patents